United States Patent [19]
Lejeune

[11] 3,811,737
[45] May 21, 1974

[54] REINFORCED RESIN WHEEL
[75] Inventor: Daniel Lejeune, Clermont-Ferrand, France
[73] Assignee: Compagnie Generale Des Etablissements Michelin, raison Sociale Michelin & Cie, Clermont-Ferrand, France
[22] Filed: Sept. 27, 1972
[21] Appl. No.: 292,602

[30] Foreign Application Priority Data
Oct. 4, 1971 France .............................. 71.35741

[52] U.S. Cl. ...................... 301/63 PW, 301/64 SD
[51] Int. Cl. ............................................. B60b 5/02
[58] Field of Search .......... 301/63 PW, 63 R, 64 R, 301/64 SD

[56] References Cited
UNITED STATES PATENTS
3,369,843  2/1968  Prew ............................ 301/63 PW
2,008,933  7/1935  Sinclair ................................ 301/65
3,158,404  11/1964  Noakes ......................... 301/63 PW
2,439,881  4/1948  Ash ..................................... 301/65

FOREIGN PATENTS OR APPLICATIONS
1,939,910  2/1971  Germany ...................... 301/63 PW Primary Examiner—Richard J. Johnson
Attorney, Agent, or Firm—Brumbaugh, Graves, Donohue & Raymond

[57] ABSTRACT

A wheel of reinforced resin comprises a disc formed with a plurality of fastening holes facilitating attachment of the wheel to a hub, and plates of rigid material embedded in the disc and formed with bores aligned with the fastening holes. The plates have an outer face that extends out at least as far as the immediately surrounding portions of the outer face of the disc.

9 Claims, 2 Drawing Figures

PATENTED MAY 21 1974  3,811,737

REINFORCED RESIN WHEEL

BACKGROUND OF THE INVENTION

This invention relates to wheels and, more particularly, to wheels made of reinforced resin and intended especially for automobiles.

Reinforced resin wheels pose a problem with regard to attachment to the hub and transmission of driving and braking torques between the hub and the tire. The conventional systems of attachment used on steel wheels are not suitable: experience shows that the regions of attachment do not withstand the forces transmitted by the metal parts, such as bolts and nuts.

SUMMARY OF THE INVENTION

An object of the invention is to provide a wheel of reinforced resin that can be readily centered and securely locked on the hub and that reliably and safely transmits the driving and braking torques between the tire and the hub.

The foregoing and other objects are attained in accordance with the invention by the provision of a reinforced resin wheel comprising a wheel disc having a plurality of hub-fastening holes extending between the outer face of the disc and the inner face, the latter being intended to rest against the hub. The wheel is characterized in that the fastening holes have their periphery reinforced by rigid plate means such as small plates of rigid material embedded in the thickness of the disc and flush with or protruding from the outer face of the disc. That is, the plates extend out at least as far adjacent to the holes as the immediately surrounding portions of the outer face of the disc.

In the preferred embodiment:

a. the thickness of the small plates is substantially less than the thickness of the wheel disc so that the hub makes direct contact with the resin;

b. the surface area of each plate, seen in plan view, is a multiple of the cross-sectional area of the associated hole;

c. the shape of each plate, seen in plan view, is generally trapezoidal or otherwise such as to facilitate its embedment in the reinforced resin by penetration into radially and/or circumferentially extending rib portions of the disc;

d. the cross section of each plate, as seen in radial section, is curved to permit partial overlapping of the plate by the outer face of the disc;

e. the plates furthermore have a hole or bore aligned with the associated fastening hole to permit the passage of the shank of a bolt or stud, and a bevel to assist in the centering of the wheel by the action of the bolts or nuts; and f. the resinous disc is formed with a continuous circumferential rib connecting the various regions of attachment of the wheel to the hub.

The wheel in accordance with the invention has the following advantages, among others:

a. on the outer face of the disc, there is a rigid surface that can serve as a bearing surface for a nut;

b. on the inner face of the disc, there is an elastic surface that permits an effective attachment by friction to the hub; and c. the use of embedded plates of a relatively large area avoids a localizing of stresses and facilitates application of the disc against the hub over an extensive area of contact.

BRIEF DESCRIPTION OF THE DRAWING

An understanding of other aspects of the invention can be gained from a consideration of the following detailed description of the preferred embodiments thereof in conjunction with the appended figures of the drawing, wherein.

DESCRIPTION OF THE PREFERRED EMBODIMENTS

Figures 1, 2:
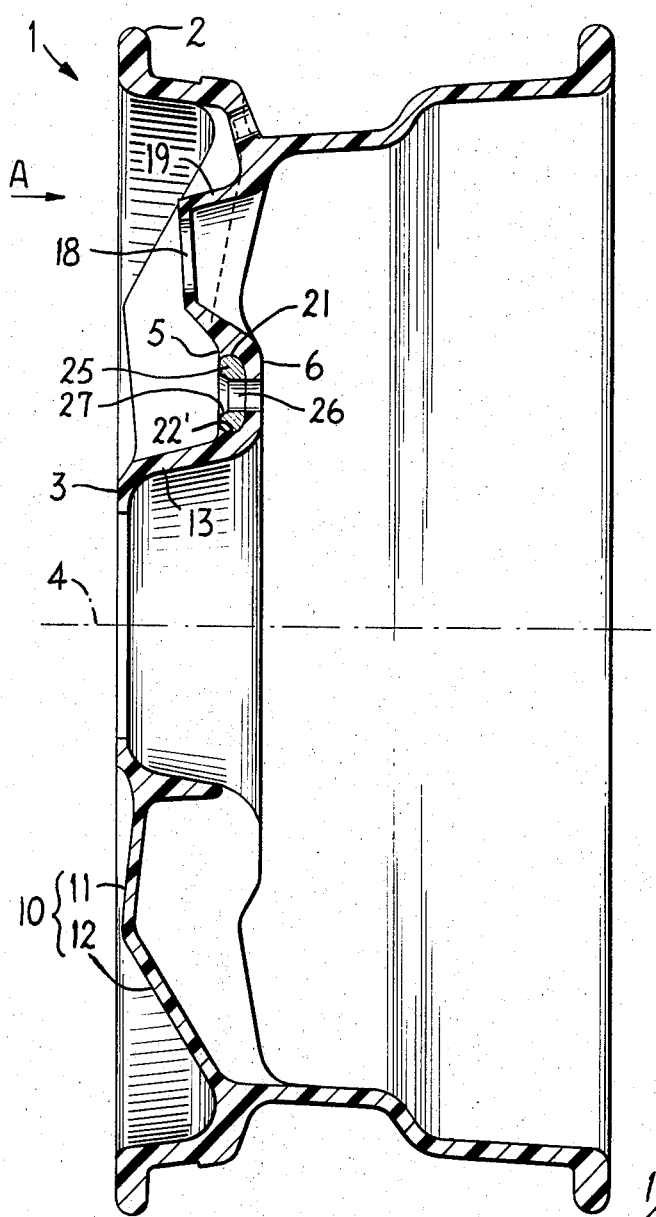
FIG. 1 is a view in radial section, along the line 1—1 of FIG. 2, of a wheel according to the invention.
FIG. 2 is a plan view, in the direction of the arrow A of FIG. 1, of one of five identical 72° sections of the wheel.

FIGS. 1 and 2 show a wheel 1 of reinforced resin comprising a rim 2 of conventional shape and a disc 3 forming an extension of the rim 2 in the direction towards the axis 4, and having an outer face 5 and an inner face 6.

The disc 3 has spoke-like portions 10 formed of two segments 11 and 12 of different inclinations to the axis 4 and connected to a generally cylindrical sleeve 13. Between two adjacent spoke-like portions 10 the disc has a well 15, which is divided into three zones: an attachment zone 16 where the disc is attached to the hub and forming the portion nearest the axis; a ventilating zone 17 having an opening 18 defined by protruding walls 19 and adapted to cool the wheel in operation, and a connecting zone 20 where the disc is attached to the rim and arranged around the ventilating zone 17.

The attachment zone 16 has a small plate 25 of steel which has in plan view (FIG. 2) the shape of a trapezoid with rounded corners and in cross section (FIG. 1) a plano-convex shape, also with rounded corners.

The plate 25 is provided with a bore hole 26 which extends into the resin wall and is provided with a bevel 27. It is arranged in the attachment zone 16 so that it is flush with the outer face 5 of the disc 3 and spaced from the inner face 6. Its lateral walls 21 are convexly curved or otherwise protruding so that they are engaged in re-entrant concavities 22, 22', which constitute, respectively, radially and circumferentially extending rib portions of the disc. This ensures a firm fixing in position. The different attachment zones are connected together by the sleeve 13 which forms a continuous circumferential rib.

The fastening system thus described resists fatigue well and provides both a firm and reliable attachment.

Without going beyond the scope of the invention, various changes may be made in the example given. Thus, instead of one plate per hole, the plate means may comprise one plate for several holes and even a single part of annular shape for the entire disc, so long as the reinforcement element or elements are embedded in the reinforced resin in such a manner that they are flush with the outer face of the disc or protrude slightly from it. Accordingly, the invention is to be construed as including all of the embodiments thereof within the scope of the appended claims.

I claim:

1. A one-piece wheel of reinforced resin comprising a wheel disc having an outer face and an inner face, the latter being intended to rest against a hub, the disc being formed with a plurality of fastening holes extending from the outer face to the inner face and facilitating attachment of the wheel to the hub, further comprising a corresponding plurality of plate means of a material more rigid than said reinforced resin embedded in the disc, each of said plate means being formed with a bore, said bores being respectively aligned with the fastening holes, and the plate means having an outer face that extends out at least as far adjacent to the holes as the immediately surrounding portions of the outer face of the disc.

2. A wheel according to claim 1 wherein the thickness of each plate means is less than that of the disc.

3. A wheel according to claim 1 wherein the area of each plate means in plan view is a multiple of the cross-sectional area of the corresponding hole.

4. A wheel according to claim 3 wherein each plate means is shaped in plan view so that it is engaged in rib portions of the disc extending radially or circumferentially.

5. A wheel according to claim 4 wherein each plate means is trapezoidal.

6. A wheel according to claim 3 wherein each plate means is curved in cross section to permit a partial covering of it on its outer face by the material of the disc.

7. A wheel according to claim 1 wherein each plate means is formed adjacent to the bore therein with a beveled portion to facilitate centering of the wheel as it is tightened on the hub.

8. A wheel according to claim 1 wherein the disc is formed with a plurality of portions protruding axially toward the hub for engagement therewith, the fastening holes being formed respectively in the axially protruding portions.

9. A wheel according to claim 1 wherein the disc further comprises a continuous circumferential rib extending into close proximity to each of the fastening holes.

* * * * *